United States Patent [19]

Fluegel

[11] Patent Number: 4,755,736
[45] Date of Patent: Jul. 5, 1988

[54] GENERATOR SYSTEM WITH INTEGRAL PERMANENT MAGNET GENERATOR EXCITER

[75] Inventor: Theodore D. Fluegel, Rockford, Ill.

[73] Assignee: Sundstrand Corporation, Rockford, Ill.

[21] Appl. No.: 947,608

[22] Filed: Dec. 30, 1986

[51] Int. Cl.$^4$ ............................................. H02P 9/14
[52] U.S. Cl. ....................................... 322/46; 310/113; 310/114; 310/181; 310/154
[58] Field of Search ............... 310/113, 68 D, 165, 310/154, 114, 181, 152, 112; 322/46

[56] References Cited

U.S. PATENT DOCUMENTS

| | | | |
|---|---|---|---|
| 2,462,761 | 2/1949 | Momberg | 310/113 UX |
| 2,722,652 | 11/1955 | Brainard | 310/68 D |
| 2,832,907 | 4/1958 | McConnell | 310/113 |
| 3,260,872 | 7/1966 | Potter | 310/54 |
| 3,931,535 | 1/1976 | Roesel | 310/113 |
| 4,223,263 | 9/1980 | Hansen | 322/47 |
| 4,409,502 | 11/1983 | McCabria | 310/165 |
| 4,472,649 | 9/1984 | Namba | 310/112 |
| 4,496,868 | 1/1985 | Advolotkin | 310/112 |
| 4,514,652 | 4/1985 | Olson | 310/54 |

FOREIGN PATENT DOCUMENTS

| | | | |
|---|---|---|---|
| 2722200 | 11/1978 | Fed. Rep. of Germany | 310/68 D |
| 0096370 | 10/1922 | Switzerland | 310/113 |
| 0298264 | 7/1954 | Switzerland | 310/113 |
| 0905948 | 2/1982 | U.S.S.R. | 310/68 D |

Primary Examiner—R. Skudy
Attorney, Agent, or Firm—Wood, Dalton, Phillips, Mason & Rowe

[57] ABSTRACT

A generator system having self-build-up characteristics with an integral permanent magnet generator exciter. A rotor shaft is journalled in a housing. A main stator is secured within the housing, and a rotating field is magnetically coupled to the main stator and secured to the rotor shaft for rotation therewith. An exciter field is secured within the housing, and an exciter armature is magnetically coupled to the exciter field and secured to the rotor shaft for rotation therewith. A plurality of permanent magnets are integrally secured to a radially inner periphery of the exciter field immediately adjacent a radially outer periphery of the exciter armature.

7 Claims, 2 Drawing Sheets

FIG. 2
PRIOR ART
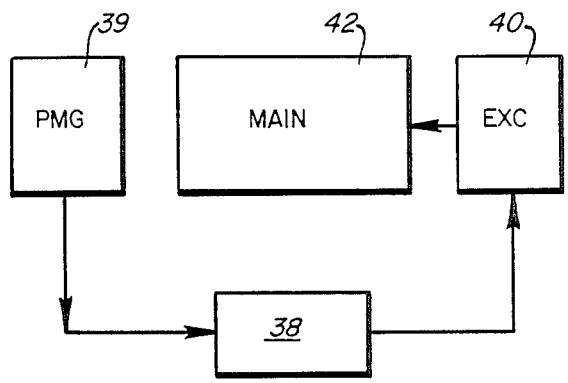
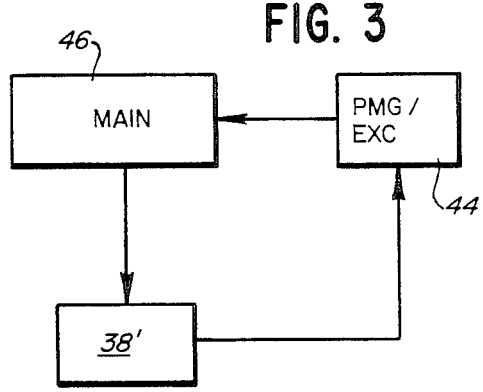
FIG. 3
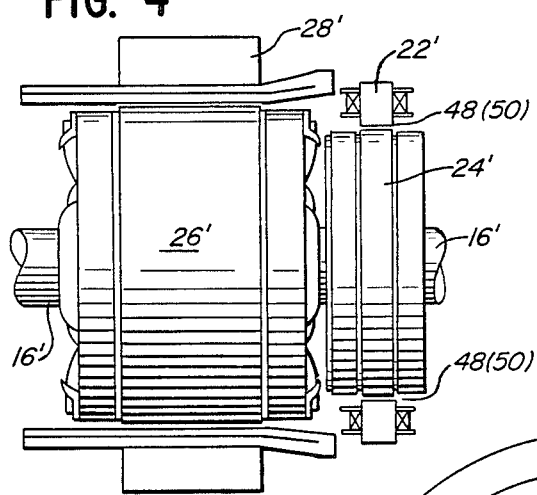
FIG. 4
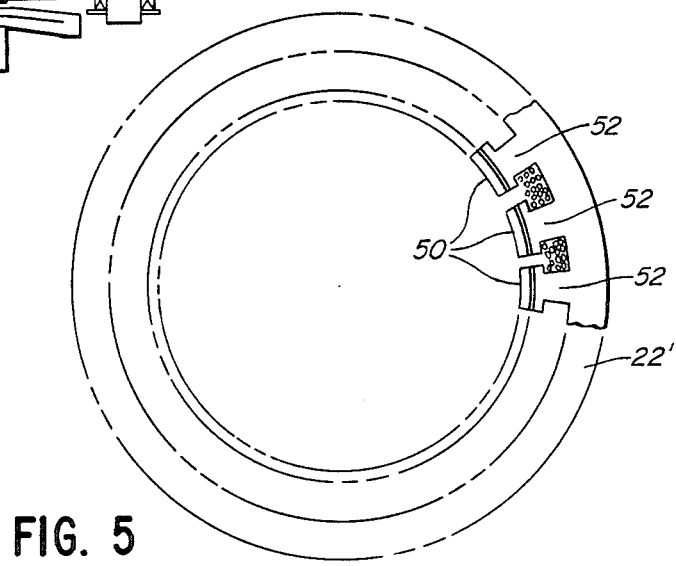
FIG. 5

GENERATOR SYSTEM WITH INTEGRAL PERMANENT MAGNET GENERATOR EXCITER

FIELD OF THE INVENTION

This invention generally relates to generator systems and, particularly, to a generator system wherein a permanent magnet generator is incorporated integral with the systeem exciter.

BACKGROUND OF THE INVENTION

Generator systems such as those used in aircraft engine applications, for example, require output voltage self-build-up charcteristics. Such systems may be incorporated in auxiliary generators for aircraft accessories or in integrated drive generators. Conventionally, such generator systems may be of a conventional brush type or may be brushless machines. Brush type DC machines do not use output rectifiers to obtain DC voltage because commutator action provides this function.

Most such generator systems include a main stator and rotating field "set" associated with a rotor shaft. A separate exciter field and exciter armature "set" also is operatively associated with the rotor shaft separate from the main stator and rotating field set. A completely separate permanent magnet generator, including permanent magnets and a stator, also is operatively associated with the rotor shaft. Examples of such generator systems utilizing three distinct "sets" are shown in U.S. Pat. Nos. 3,260,872 to Potter, dated Apr. 13, 1964; 4,223,263 to Hansen, Jr. et al, dated Sept. 16, 1980 and 4,514,652 to Olson, dated Apr. 30, 1985, the Olson patent being assigned to the assignee of this invention.

As is known and can be derived from the aforesaid patents, the permanent magnet generator provides sufficient induced current to create a magnetic field in the exciter of the generator system. This, in turn, causes generation of current in the exciter rotor windings, usually as alternating current, which then is rectified to energize the main rotor windings which, in turn, causes the induction of current within the main stator windings which is employed as desired, such as for aircraft accessories.

This invention is directed to a new and improved generator system of the character described wherein a permanent magnet generator is incorporated integral with the exciter set.

SUMMARY OF THE INVENTION

An object, therefore, of the invention is to provide a generator system having self-build-up characteristics with an integral permanent magnet generator (PMG) exciter.

In the exemplary embodiment of the invention, the generator system includes a housing with rotating means journalled in the housing. A main stator is secured within the housing. A rotating field is magnetically coupled to the main stator and secured to the rotating means for rotation therewith. An exciter field is secured within the housing, and an exciter armature is magnetically coupled to the exciter field and secured to the rotating means for rotation therewith. Permanent magnet means are mounted integrally between the exciter field and exciter armature for interacting therewith to provide a magnetic circuit.

More specifically, the rotating means comprises a rotor shaft with the main stator and rotating field disposed at one axial location along the rotor shaft. The exciter field, exciter armature and integral permanent magnet means are located at a second axial location on the rotor shaft immediately adjacent the main stator and rotating field.

The permanent magnet means include a plurality of permanent magnets disposed about a radially inner periphery of the exciter field immediately adjacent a radially outer periphery of the exciter armature. As illustrated herein, the permanent magnets are mounted integral to the radially inner ends of the exciter field poles.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 2 is a schematic illustration of the operating characteristics of the generator system of FIG. 1;

FIG. 3 is a schematic illustration of the operating characteristics of the generator system of the invention.

FIG. 4 is an isolated section of the generator, exciter and PMG arrangement of the invention; and FIG. 5 is a fragmented elevation, taken in an axial direction, illustrating the construction of the exciter field and permanent magnets.

DETAILED DESCRIPTION OF THE PREFERRED EMBODIMENT

Figure 1:
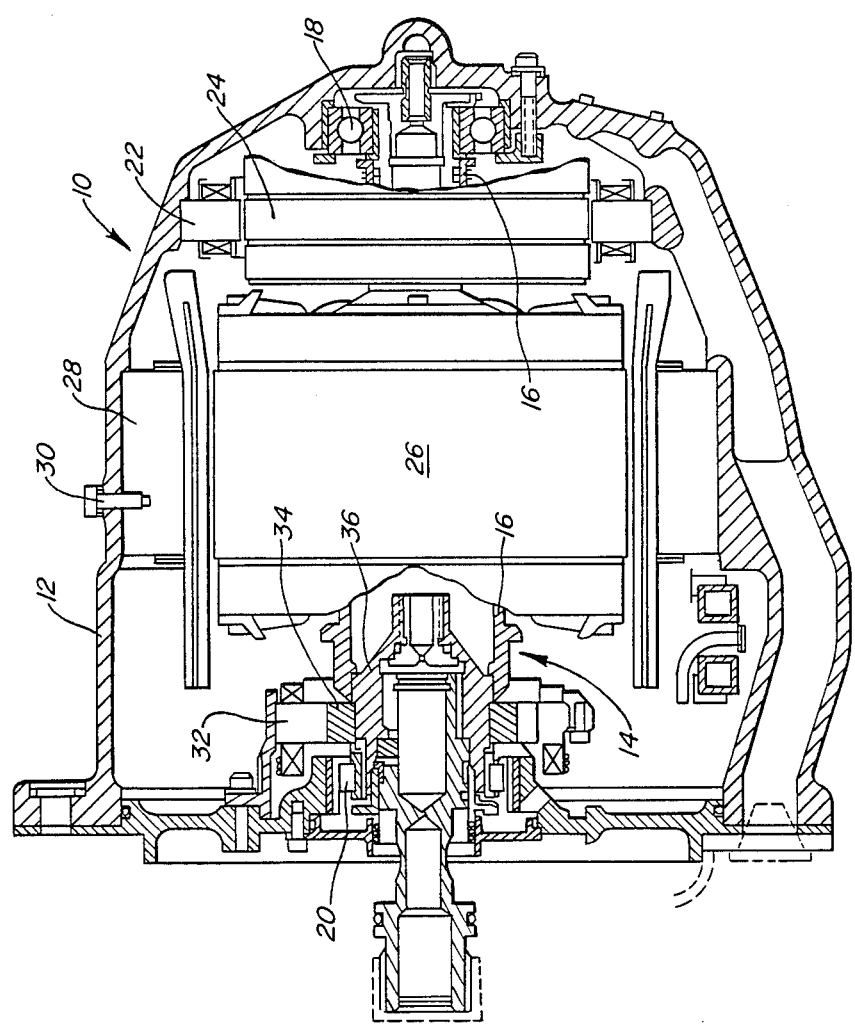
FIG. 1 is an axial sectional view through a generator system of the prior art.

Referring to the drawings in greater detail, and first to FIG. 1, a brushless generator system, generally designated 10, of the prior art is illustrated and includes a housing 12 having rotating means, generally designated 14, and including a rotor shaft 16 journalled in the housing by suitable bearings 18 and 20. The excitation system of the generator includes an exciter field or exciter stator 22, an exciter armature 24, a rotating field 26 and a main stator 28.

Main stator 28 and exciter field 22 are suitably secured within housing 12, such as by fastening means 30 for main stator 28 and a press-fit for exciter stator 22. Rotating field 26 is suitably secured to rotor shaft 16. Exciter armature 24 also is suitably secured to rotor shaft 16. Therefore, both rotating field 26 and exciter armature or rotor 24 rotate conjointly with rotor shaft 16. As is well known, a plurality of rectifying diodes (not shown) are incorporated in the system and, as with some such prior art systems, the rectifying diodes are carried by exciter armature 24.

With the prior art of FIG. 1, a completely separate permanent magnet generator (PMG) is incorporated in the system. The PMG includes a stator 32 which is suitably secured, such as by a press-fit or the like, within housing 12 and magnetically coupled to a permanent magnet means 34 appropriately secured to rotating means 14, as by a cup member 36 or the like which carries the permanent magnet. Therefore, the permanent magnet also rotates in unison or conjointly with rotating field 26 and exciter armature 24.

From the foregoing, it can be seen that the main stator 28 and rotating field 26 "set" is distinct from the exciter stator 22 and rotating exciter armature 24 "set" which, in turn, is separate and distinct from the PMG stator 32 amd rotating permanent magnet means 34 "set" at different axial locations along rotating means 14 and rotor shaft 16.

Generally, as is well known, the permanent magnet generator provides sufficient induced current which is controlled by a generator control unit 38 to create a magnetic field in the exciter. This in turn causes generation of current in the exciter rotor, usually as alternating current, which then is rectified by means, not shown, to energize the main rotor windings which, in turn, causes the induction of current within the stator windings which is employed as a load, as desired. These general operating characteristics are schematically illustrated in FIG. 2 wherein the permanent magnet generator is indicated at 39, the generator control unit is shown at 38, the exciter is shown at 40 and th main stator and rotating field is shown at 42.

Applying the general schematic logic to the specifics of the prior art generator system of FIG. 1, permanent magnet means 34 rotate on cup member 36 as part of rotating means 14. Rotation of the permanent magnet means generates a flux to the PMG stator 32 which provides power to exciter field or stator 22. Exciter armature or rotor 24 provides a current to the rectifying means (not shown) which, in turn, supplies current for main generator rotating field 26 which, in turn, causes the induction of current within the winding of main stator 28 which is employed, as is desired, to a load. In normal operation, the permanent magnet generator provides more induced current than is sufficient for the exciter. Therefore, recycling for exciter field build-up does not take place.

With the invention as schematically illustrated in FIG. 3, the permanent magnet generator is incorporated in and integral with the exciter, as indicated at 44, to energize the main rotor windings to induce current within the main stator windings, as indicated at 46. The generator control unit 38' is coupled between the main generator and the integral PMG/exciter. It can be seen that recycling for exciter field build-up takes place by the system of the invention. In other words, generator control unit 38' senses that insufficient current is provided to the main rotor windings, at 46, and returns the current to the exciter stator which, as will be seen hereinafter, is outside the permanent magnet means, to continue the recycling. This continues, although momentarily, until enough energization is provided to the main generator. In essence, the permanent magnet means constitutes a "tickler" in the scheme of the recycling system of the invention.

More specifically, and referring to FIG. 4, the invention contemplates a main rotating field 26' rotatable on a rotor shaft 16' so as to be magnetically coupled to a main stator 28'. An exciter field 22' is secured within the generator system housing, and an exciter armature or rotor 24' is magnetically coupled to exciter field 22' and secured to rotor shaft 16' for rotation therewith.

In the generator system of the invention, permanent magnet means 48 are mounted integrally with exciter field 22' between exciter field 22' and exciter armature 24' for interacting therewith to provide a magnetic circuit. Specifically, and referring to FIG. 5 in conjunction with FIG. 4, a plurality of permanent magnets 50 are mounted integral to the inner ends of exciter field poles 52 of exciter field or stator 22'. The permanent magnets may be made of a rare earth material, such as samarium cobalt or the like. The individual permanent magnets may be bonded or adhered directly to the inside diameter areas of exciter field poles 52 to be integral therewith. Therefore, the permanent magnets are disposed about the radially inner periphery of the exciter field immediately adjacent the radially outer periphery of the exciter armature.

With the system of the invention, and comparing FIGS. 2 and 3, the separate and distinct permanent magnet generator of the prior art as exemplified by the schematic illustration of FIG. 2 and the aforementioned patents, is completely eliminated, while affording the recycling operating charcteristics described above in relation to FIG. 3. Other advantages include providing a considerably smaller generator system which eliminates housing and shaft weight as well as the other components for mounting a separate PMG.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A generator system having self-buildup characteristics with an integral PMG exciter, comprising:
    housing means;
    rotating means journaled in the housing means;
    a main stator secured within the housing;
    a rotating field magnetically coupled to the main stator and secured to the rotating means for rotation therewith;
    an exciter field secured within the housing;
    an exciter armature magnetically coupled to the exciter field and secured to the rotating means for rotation therewith; and
    permanent magnet means disposed about a radially inner periphery of the exciter field immediately adjacent a radially outer periphery of the exciter armature for interacting therewith to provide a magnetic circuit.

2. The generator system of claim 1 wherein said permanent means are mounted integral with inner ends of poles of exciter field poles.

3. A generator system having self-buildup characteristics with an integral PMG exciter, comprising:
    housing means;
    a rotor shaft journaled in the housing means;
    a main stator secured within the housing and magnetically coupled to a rotating field secured to the rotor shaft at one axial location therealong for rotation therewith;
    an exciter field secured within the housing and magnetically coupled to an exciter armature secured to the rotor shaft for rotation therewith at a second axial location therealong; and
    a plurality of permanent magnets disposed about a radially inner periphery of the exciter field immediately adjacent a radially outer periphery of the exciter armature.

4. The generator system of claim 3 wherein the exciter field, exciter armature and the permanent magnets are located immediately adjacent the main stator and rotating field.

5. The generator system of claim 3 wherein said permanent magnets are mounted integral with inner ends of poles of the exciter field.

6. A generator system having self-buildup characteristics with an integral PMG exciter, comprising:
   housing means;
   rotating means journaled in the housing means;
   a main stator and rotating field set with the main stator secured within the housing and the rotating field secured to the rotating means at one axial location therealong;
   an exciter field and exciter armature set with the exciter field secured within the housing and the exciter armature secured to the rotating means at a second axial location therealong; and
   a plurality of permanent magnets disposed about a radially inner periphery of the exciter field immediately adjacent a radially outer periphery of the exciter armature for interacting therewith to provide a magnetic circuit.

7. The generator system of claim 6 wherein said permanent magnets are mounted integral with inner ends of poles of the exciter field.

* * * * *